United States Patent
Johansson et al.

(10) Patent No.: US 8,620,558 B2
(45) Date of Patent: *Dec. 31, 2013

(54) METHOD AND MODULE FOR CONTROLLING A VELOCITY OF A VEHICLE

(75) Inventors: Oskar Johansson, Stockholm (SE);
Jörgen Hansson, Hägersten (SE);
Henrik Pettersson, Södertälje (SE);
Maria Södergren, Segeltorp (SE)

(73) Assignee: Scania CV AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/377,185

(22) PCT Filed: May 31, 2010

(86) PCT No.: PCT/SE2010/050591
§ 371 (c)(1),
(2), (4) Date: Dec. 9, 2011

(87) PCT Pub. No.: WO2010/144028
PCT Pub. Date: Dec. 16, 2010

(65) Prior Publication Data
US 2012/0083985 A1 Apr. 5, 2012

(30) Foreign Application Priority Data

Jun. 10, 2009 (SE) .................................... 0950442

(51) Int. Cl.
*G05D 1/00* (2006.01)
(52) U.S. Cl.
USPC .......................................................... 701/93
(58) Field of Classification Search
USPC ............................ 701/93, 96, 7, 931; 180/170
See application file for complete search history.

(56) References Cited

U.S. PATENT DOCUMENTS 6,076,036 A * 6/2000 Price et al. ...................... 701/93
6,306,062 B1 * 10/2001 Toukura et al. ............... 477/107
(Continued)

FOREIGN PATENT DOCUMENTS

| JP | 07117524 A | 5/1995 |
|---|---|---|
| SE | 529578 C2 | 9/2007 |
| WO | WO 2006/107267 A1 | 10/2006 |

OTHER PUBLICATIONS

International Search Report dated Sep. 10, 2010, issued in corresponding international application No. PCT/SE2010/050591.

*Primary Examiner* — Mary Cheung
*Assistant Examiner* — Anne Mazzara
(74) *Attorney, Agent, or Firm* — Ostrolenk Faber LLP (57) ABSTRACT

A method for regulating a vehicle's speed including the steps of: determining a horizon by means of position data and map data of an itinerary made up of route segments with length and gradient characteristics for each segment; calculating threshold values for the gradient of segments according to one or more vehicle-specific values, which threshold values serve as boundaries for assigning segments to various categories; comparing the gradient of each segment with the threshold values and placing each segment within the horizon in a category according to the results of the comparisons; and, for each segment within the horizon which is in a category indicating a steep upgrade or a steep downgrade, calculating the vehicle's final speed $v_{end}$ after the end of the segment, based inter alia on the entry speed $v_i$ to the segment; and determining the entry speed $v_i$ for said segment based on the calculated final speed vend for the segment, which determination is defined by rules for said segment's category, so that the vehicle's final speed $v_{end}$ is within the range defined by $v_{max}$ and $v_{min}$ for the vehicle's current reference speed $v_{set}$, on the supposition that $v_i$ is determined within the same range; and regulating the vehicle's speed according to speed set-point values $v_{ref}$ based on the entry speeds $v_i$ to each segment.

16 Claims, 6 Drawing Sheets

(56) References Cited

U.S. PATENT DOCUMENTS

| | | | |
|---|---|---|---|
| 6,990,401 B2 * | 1/2006 | Neiss et al. | 701/96 |
| 7,050,898 B2 * | 5/2006 | Ono et al. | 701/70 |
| 7,162,353 B2 * | 1/2007 | Minowa et al. | 701/96 |
| 7,548,812 B2 * | 6/2009 | Guenthner et al. | 701/93 |
| 8,055,427 B2 * | 11/2011 | Shin | 701/93 |
| 2003/0204298 A1 | 10/2003 | Ahmed-Zaid et al. | |
| 2004/0068359 A1 | 4/2004 | Neiss et al. | |
| 2004/0084237 A1 * | 5/2004 | Petrie, Jr. | 180/170 |
| 2007/0265759 A1 * | 11/2007 | Salinas et al. | 701/93 |
| 2009/0037070 A1 * | 2/2009 | Nakamura | 701/96 |
| 2010/0161195 A1 * | 6/2010 | Shin | 701/93 |

* cited by examiner

FIG. 8 ized to know the topology ahead...

METHOD AND MODULE FOR CONTROLLING A VELOCITY OF A VEHICLE

CROSS-REFERENCE TO RELATED APPLICATIONS

The present application is a 35 U.S.C. §§371 national phase conversion of PCT/SE2010/050591, filed May 31, 2010, which claims priority of Swedish Application No. 0950442-4, filed Jun. 10, 2009, the contents of which are incorporated by reference herein. The PCT International Application was published in the English language.

FIELD OF THE INVENTION

The present invention relates to a method and a module for regulating a vehicle's speed.

BACKGROUND TO THE INVENTION

Many vehicles today are equipped with a cruise control to make it easier for the driver to drive the vehicle. The desired speed can then be set by the driver, e.g. via a control device in the steering wheel console, and a cruise control system in the vehicle acts thereafter upon a control system so that it accelerates and brakes the vehicle in order to maintain a desired speed. If the vehicle is equipped with an automatic gearchange system, the vehicle's gears are changed so that the vehicle can maintain the desired speed.

When a cruise control is used in hilly terrain, the cruise control system will try to maintain a set speed on upgrades. This results inter alia in the vehicle accelerating over the crest of a hill and possibly into a subsequent downgrade, making it necessary to brake to avoid exceeding the set speed, which is a fuel-expensive way of running the vehicle.

By varying the vehicle's speed in hilly terrain it is possible to save fuel as compared with a conventional cruise control. This may be done in various ways, e.g. by calculations of the vehicle's current state (as with Scania Ecocruise®). If an upgrade is calculated, the system then accelerates the vehicle uphill. Towards the end of the climb, the system is programmed to avoid acceleration until the gradient has levelled out at the top, provided that the vehicle's speed does not drop below a certain level. Lowering the speed at the end of an upgrade makes it possible to regain speed on a subsequent downgrade without using the engine to accelerate. When the vehicle approaches the bottom of a dip, the system endeavours to use kinetic energy to embark on the next upgrade at a higher speed than an ordinary cruise control. The system will easily provide acceleration at the end of the downgrade in order to maintain the vehicle's momentum. In undulating terrain, this means that the vehicle starts the next climb at a higher speed than normal. Avoiding unnecessary acceleration and using the vehicle's kinetic energy makes it possible to save fuel.

If the topology ahead is made known by the vehicle having map data and GPS, such a system can be made more robust and can also change the vehicle's speed in anticipation.

Published patent application WO 2006/107267 A1 describes a method and a system for controlling the operation of a vehicle with an anticipatory cruise control function. Before the vehicle sets off, steep rises and falls along the itinerary are identified by points. The locations of the points are calculated on the basis of a number of parameters and are stored together with the itinerary before the vehicle sets off.

The object of the present invention is to control the vehicle's speed in a fuel economising way in hilly terrain.

SUMMARY OF THE INVENTION

The object described above is achieved according to a first aspect by a method for regulating a vehicle's speed which comprises the steps of:

A) determining a horizon using position data and map data of an itinerary made up of route segments with length and gradient characteristics for each segment;

B) calculating threshold values for the gradient of segments according to one or more vehicle-specific values, which threshold values serve as boundaries for assigning segments to various categories;

C) comparing the gradient of each segment with the threshold values and placing each segment within the horizon in a category according to the results of the comparisons; and, for each segment within the horizon which is placed in a category indicating a steep upgrade or a steep downgrade, the method comprises:

D) calculating the vehicle's final speed $v_{end}$ after the end of the segment, based inter alia on the entry speed $v_i$ to said segment; and if the calculated final speed $v_{end}$ is outside the range for the vehicle's current reference speed $v_{set}$ defined by $v_{max}$ and $v_{min}$, the method performs the step of E) correcting the entry speed $v_i$ for said segment on the basis of the calculated final speed $v_{end}$ for the segment, which correction is defined by rules for said segment's category, so that $v_{min} \leq v_{end} \leq v_{max}$, on the supposition that $v_i$ is corrected within the same range;

F) regulating the vehicle's speed according to speed setpoint values $v_{ref}$ based on the entry speeds $v_i$ to each segment.

The invention comprises also according to a second aspect a module for regulating a vehicle's speed, which module comprises:

a horizon unit configured and operable to determine a horizon using received position data and map data of an itinerary made up of route segments with length and gradient characteristics for each segment;

a processor unit configured and operable for:
calculating threshold values for the gradient of segments according to one or more vehicle-specific values, which threshold values serve as boundaries for assigning segments to various categories;
comparing the gradient of each segment with the threshold values and placing each segment within the horizon in a category according to the results of the comparisons; and, for each segment within the horizon which is placed in a category indicating a steep upgrade or a steep downgrade, the processor unit is adapted configured and operable for:
calculating the vehicle's final speed $v_{end}$ after the end of the segment, based inter alia on the entry speed $v_i$ to said segment; and
determining the entry speed $v_i$ for said segment based on the calculated final speed $v_{end}$ for the segment, which determination is defined by rules for said segment's category, so that the vehicle's final speed $v_{end}$ is within the range defined by $v_{max}$ and $v_{min}$ for the vehicle's current reference speed $v_{set}$, on the supposition that $v_i$ is determined within the same range; and
a control system is adapted to regulating the vehicle's speed according to speed set-point values $v_{ref}$ based on the entry speeds $v_i$ to each segment.

The method described above achieves a robust and computationally effective algorithm which quickly and reliably generates speed set-point values by which the control system can control the vehicle.

When there is within the horizon an imminent steep upgrade, how much speed the vehicle is expected to lose during the climb is therefore calculated. If the result is below a minimum speed $v_{min}$ predefined by, for example, the driver or the module, the speed set-point values $v_{ref}$ are corrected upwards before the upgrade, but at most up to $v_{max}$. Raising the speed before the climb results in a time saving in that the speed will not decrease as much as when using a traditional cruise control which only sets the vehicle's speed according to a reference speed $v_{set}$. Raising the vehicle's speed before the upgrade therefore only takes place when it is calculated that the vehicle's speed will drop to below a preset minimum speed $v_{min}$.

When there is within the horizon an imminent steep downgrade, the system calculates the speed to which the vehicle's speed is expected to increase during the downhill run. If the result exceeds a maximum speed $v_{max}$ predefined by, for example, the driver or the system, the speed set-point values $v_{ref}$ are corrected downwards before the downgrade, but at most down to $v_{min}$. Utilising the potential energy on the downhill run by maintaining the raised speed results in a time saving as compared with a traditional cruise control which is not allowed to vary from its reference value $v_{set}$. Adjustment of the predicted speed during the downhill run therefore only takes place when the vehicle is expected to reach a speed which exceeds a maximum speed $v_{max}$.

As the vehicle's speed according to the method is allowed by the module to decrease to $v_{min}$ on an upgrade, with consequent expectation of accelerating to regain lost speed until after the crest of the hill, i.e. on level road, the result is a time saving as compared with the vehicle having to maintain the reference speed $v_{set}$ during the climb, since it takes more fuel to maintain speed uphill than to regain speed after the climb. If the upgrade is followed by a downgrade, the speed can be kept at a lower level uphill to avoid braking on the downhill run because of the vehicle's speed becoming too high, and the vehicle uses instead the potential energy due to its own weight downhill. If the predicted speed downhill is greater than the reference speed $v_{set}$ adopted by the driver, the predicted speed can be maintained, enabling the vehicle to "swing" into an imminent upgrade.

Preferred embodiments are described in the dependent claims and the detailed description.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Information about a vehicle's itinerary can be used to regulate its speed in anticipation in order to save fuel, increase safety and enhance comfort. Topography greatly affects the control of, in particular, the driveline of heavy vehicles, since much more torque is required uphill than downhill and to make it possible to climb some hills without changing gear.

The vehicle is provided with a positioning system and map information, and position data from the positioning system and topology data from the map information are used to construct a horizon which illustrates the nature of the itinerary. In the description of the present invention, GPS (Global Positioning System) is indicated for determining position data for the vehicle, but it should be appreciated that other kinds of global or regional positioning systems are also conceivable to provide the vehicle with position data, e.g. systems which use a radio receiver to determine the vehicle's position. The vehicle may also use sensors to scan the surroundings and thereby determine its position.

Figure 1:
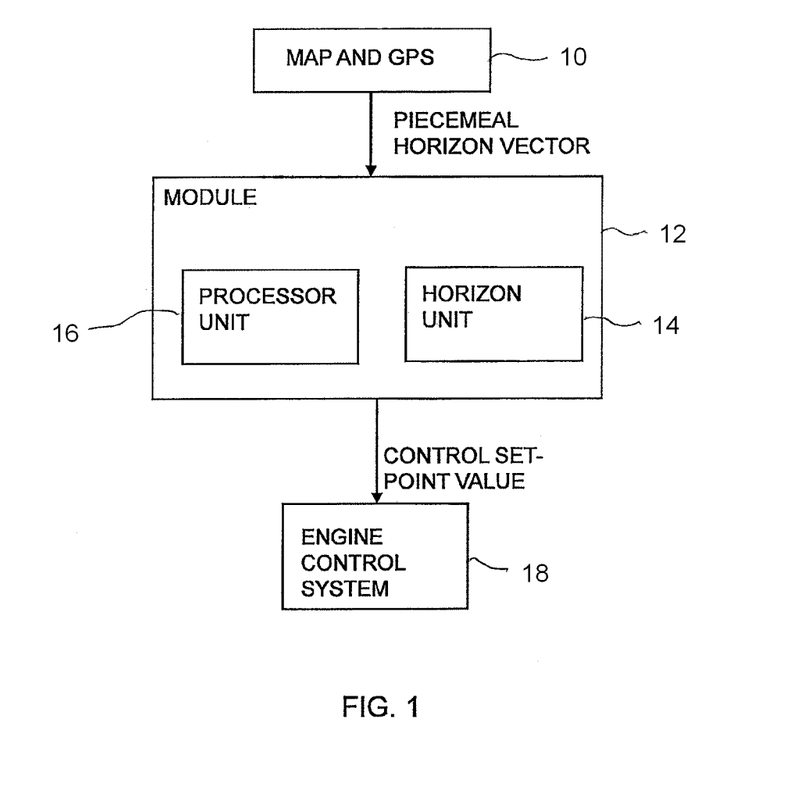
FIG. 1 depicts the functional context of the regulating module in the vehicle according to an embodiment of the invention.

FIG. 1 illustrates how a unit incorporates map and GPS information 10 about the itinerary. The itinerary is exemplified below as a single route for the vehicle but it should be appreciated that various conceivable itineraries are incorporated as information via maps and GPS or other positioning systems. The driver may also register the starting point and destination point of the intended journey, in which case the unit uses map data etc. to calculate a suitable route. The itinerary or, if there are two or more possible alternatives, the itineraries are sent bit by bit via CAN to a module 12 for regulation of set-point values, which module may be separate from or form part of the control system which is to use the set-point values to regulate the vehicle's speed. Alternatively, the unit 10 with maps and a positioning system may also be part of a system which uses the set-point values for regulating. In the regulating module 12, the bits are put together in a horizon unit 14 to form a horizon and are processed by the processor unit 16 to create an internal horizon by which the control system can regulate. If there are two or more alternative itineraries, a number of internal horizons are created for the various alternatives. The horizon or horizons are then continually supplemented by new bits from the unit with GPS and map data to maintain a desired length of horizon. The horizon is thus updated continuously when the vehicle is in motion.

CAN (Controller Area Network) is a serial bus system specially developed for use in vehicles. The CAN database makes digital data exchange possible between sensors, regulating components, actuators, control devices, etc. and ensures that two or more control devices can have access to the signals from a given sensor in order to use them to control components connected to them.

Figure 2:
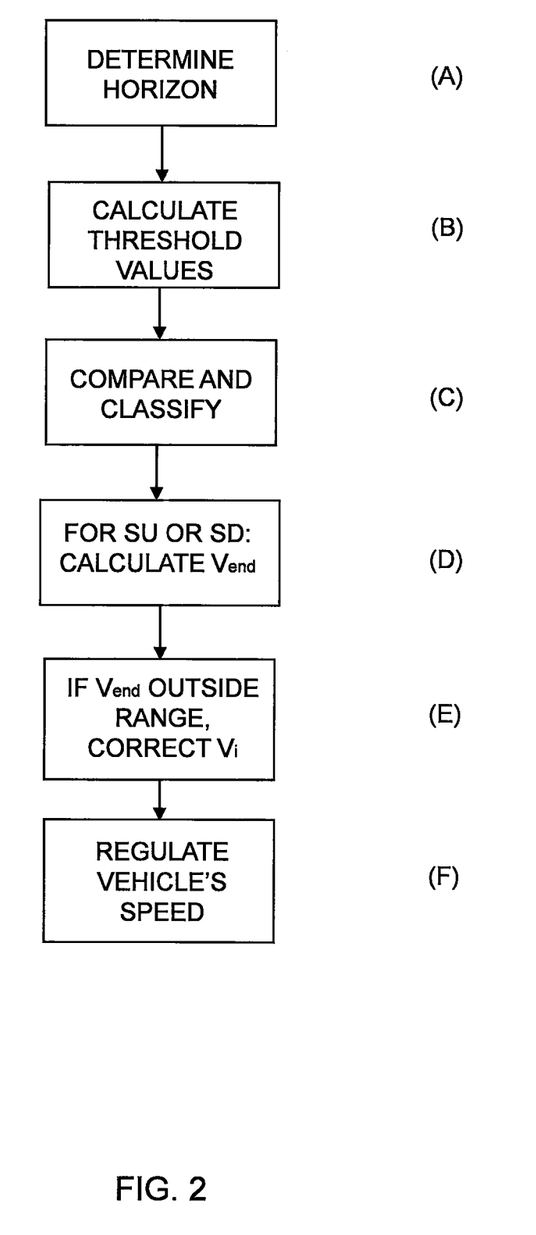
FIG. 2 depicts a flowchart for the method according to an embodiment of the invention.

FIG. 2 is a flowchart illustrating the steps which the method according to an embodiment of the invention comprises. The example described below refers to only one horizon but it should be appreciated that two or more horizons for various alternative itineraries may be constructed in parallel. A first step A) determines a horizon based on position data and map data of an itinerary made up of route segments with length and gradient characteristics for each segment. When the vehicle is on the move, the horizon module puts the bits together to form a horizon of the itinerary, the length of the horizon being typically of the order of 1 to 2 km. The horizon unit keeps track of where the vehicle is and continually adds to the horizon so that the length of the horizon is kept constant. According to an embodiment, when the destination point of the journey is within the length of the horizon, the horizon is no longer added to, since travelling beyond the destination point is not relevant.

The horizon is made up of route segments which have characteristics in the form of their length and gradient associated with them. The horizon is here exemplified in matrix form in which each column contains a characteristic for a segment. A matrix covering 80 m forwards of an itinerary may take the following form:

$$\begin{bmatrix} dx, & \% \\ 20, & 0.2 \\ 20, & 0.1 \\ 20, & -0.1 \\ 20, & -0.3 \end{bmatrix},$$

where the first column is the length of each segment in metres (dx) and the second column the gradient in % of each segment. The matrix is to be taken to mean that for 20 metres forwards from the vehicle's current position the gradient is 0.2%, followed by 20 metres with a gradient of 0.1%, and so on. The values for segments and gradients need not be expressed in relative values but may instead be expressed in absolute values. The matrix is with advantage vector-formed but may instead be of pointer structure, in the form of data packages or the like. There are also various other conceivable characteristics for segments, e.g. radius of curvature, traffic signs, various hindrances etc.

Thereafter, the segments within the horizon are placed in various categories in a step B) in which threshold values are calculated for the gradient of segments according to one or more vehicle-specific values, which threshold values serve as boundaries for assigning segments to different categories. The threshold values for the gradient are calculated, according to an embodiment of the invention, by one or more vehicle-specific values, e.g. current transmission ratio, current vehicle weight, the engine's maximum torque curve, mechanical friction and/or the vehicle's running resistance at current speed. A vehicle model internal to the control system is used to estimate running resistance at current speed. Transmission ratio and maximum torque are known magnitudes in the vehicle's control system, and vehicle weight is estimated on-line.

The following are examples of five different categories in which segments may be placed:

| | |
|---|---|
| Level road: | Segment with gradient 0 ± a tolerance. |
| Steep upgrade: | Segment with too steep a gradient for the vehicle to maintain speed in current gear. |
| Gentle upgrade: | Segment with gradient between tolerance and threshold value for sharp upgrade. |
| Steep downgrade: | Segment with such a steep downhill gradient that the vehicle is accelerated by the gradient. |
| Gentle downgrade: | Segment with a downward gradient between the negative tolerance and the threshold value for sharp downgrade. |

To place segments in the categories described above, threshold values are therefore calculated in the form of two gradient threshold values $l_{min}$ and $l_{max}$, where $l_{min}$ is the minimum gradient for the vehicle to be accelerated by the gradient downhill, and $l_{max}$ is the maximum gradient at which the vehicle can maintain speed without changing gear uphill. Thus the vehicle's speed can be regulated according to the gradient and length of the road ahead so that the vehicle can be driven in a fuel economising way by means of cruise control in undulating terrain. For example, the tolerance for the "level road" category is preferably between 0.05% and −0.05% when the vehicle travels at 80 km/h. On the basis of the same speed (80 km/h), $l_{min}$ is usually calculated to be of the order of −2 to −7%, and $l_{max}$ usually 1 to 6%. However, these values depend greatly on current transmission ratio (gear+fixed rear axle ratio), engine performance and total weight.

In a next step C) the method compares the gradient of each segment with the threshold values, and each segment within the horizon is placed in a category according to the results of the comparisons.

After each segment within the horizon has been placed in a category, an internal horizon for the control system can be constructed on the basis of the classification of segments and the horizon. The internal horizon comprises entry speeds $v_i$ to each segment, which are speeds which the control system has to abide by. Each segment also has a final speed $v_{end}$ which is equal to the entry speed $v_i$ to the next segment.

For each segment within the horizon which is in a category indicating a steep upgrade or a steep downgrade, the method comprises a step D) for calculating the vehicle's final speed $v_{end}$ after the end of the segment, based inter alia on the entry speed $v_i$ to that segment; and if the calculated final speed $V_{end}$ is outside the range for the vehicle's current reference speed $v_{set}$ which is defined by $v_{max}$ and $v_{min}$, the method performs a step E) to correct the entry speed $v_i$ for that segment on the basis of the calculated final speed $v_{end}$ for the segment, which correction is defined by rules for said segment's category so that $v_{min} \le V_{end} \le v_{max}$, on the supposition that $v_i$ is corrected within the same range. $v_{end}$ is therefore corrected to be within the range for $v_{set}$. If the calculated final speed $v_{end}$ is within the range for $v_{set}$, the method goes on to the next segment within the horizon instead of correcting the entry speed $v_i$ and the final speed $v_{end}$ according to step E). $v_{set}$ is the reference speed set by the driver and desired to be kept by the vehicle's control systems within a range when the vehicle is in motion.

The range is bounded by two speeds $v_{min}$ and $v_{max}$ which may be set manually by the driver or be set automatically by calculations of a suitable range is preferably calculated in the regulating module. The vehicle's speed is thereafter regulated in a step F) according to speed set-point values $v_{ref}$ based on the entry speeds $v_i$ to each segment. Set-point values $v_{ref}$ for the control system in the vehicle may therefore be allowed to vary between the two abovementioned speeds $v_{min}$ and $v_{max}$, and when the method predicts an internal horizon for the vehicle's speed, the vehicle's speed may then vary within this range.

According to an embodiment, a speed change requested is ramped between two entry speeds $v_i$ to provide the control system with set-point values $v_{ref}$ which bring about a gradual increase or decrease in the vehicle's speed. Ramping a speed change results in calculation of gradual speed changes which need to be made to achieve the speed change. In other words, a linear speed increase is achieved by ramping. All the segments within the horizon are stepped through continuously, and as new segments are added to the horizon the entry speeds $v_i$ are adjusted as necessary in segments, within the range of the vehicle's reference speed $v_{set}$.

The various rules for the segment categories therefore regulate how the entry speed $v_i$ for each segment is to be adjusted. If a segment is placed in the "level road" category, no change will take place in the entry speed $v_i$ to the segment. Driving the vehicle such that comfort requirements are met involves using Torricelli's equation as below to calculate the constant acceleration or retardation which needs to be applied to the vehicle:

$$v_{end}^2 = v_i^2 + 2 \cdot a \cdot s \qquad (1)$$

where $v_i$ is the entry speed to the segment, $v_{end}$ the vehicle's speed at the end of the segment, a the constant acceleration/retardation and s the length of the segment.

If a segment is in the "steep upgrade" or "steep downgrade" category, the final speed $v_{end}$ for the segment is predicted by solving equation (2) below:

$$v_{end}^2 = (a \cdot v_i^2 + b) \cdot (e^{(2 \cdot a \cdot s/M)} - b)/a \qquad (2)$$

where $$a = -C_d \cdot \rho \cdot A/2 \qquad (3)$$

$$b = F_{track} - F_{roll} - F_\alpha \qquad (4)$$

$$F_{track} = (T_{eng} \cdot i_{final} \cdot i_{gear} \cdot \mu_{gear})/r_{wheel} \qquad (5)$$

$$F_{roll} = \text{flatCorr} \cdot M \cdot g/1000 \cdot (C_{rrisoF} + C_b \cdot (v_i - v_{iso}) + C_{aF} \cdot (v_i^2 - v_{iso}^2)) \qquad (6)$$

$$F_\alpha = M \cdot g \cdot \sin(\arctan(\alpha)) \qquad (7)$$

$$\text{flatCorr} = 1/\sqrt{(1 + r_{wheel}/2.70)} \qquad (8)$$

The vehicle's final speed $v_{end}$ after the end of the segment is thus calculated according to this embodiment on the basis of the entry speed $v_i$ to the segment, the force $F_{track}$ acting from the engine torque in the vehicle's direction of movement, the force $F_{roll}$ from the rolling resistance acting upon the vehicle's wheels, and the force $F_\alpha$ acting upon the vehicle because of the gradient $\alpha$ of the segment. In addition, $C_d$ is the air resistance coefficient, $\rho$ the density of the air, A the largest cross-sectional area of the vehicle, $T_{eng}$ the engine torque, $i_{final}$ the vehicle's final gear, $i_{gear}$ the current transmission ratio in the gearbox, $\mu_{gear}$ the efficiency of the gear system, $r_{wheel}$ the vehicle's wheel radius, M the vehicle's weight, $C_{aF}$ and $C_b$ speed-dependent coefficients related to the rolling resistance of the wheels, $C_{rrisoF}$ a constant term related to the rolling resistance of the wheels and $v_{iso}$ an ISO speed, e.g. 80 km/h.

On segments in the "steep upgrade" category, the final speed $v_{end}$ is thereafter compared with $v_{min}$, and if $v_{end} < v_{min}$, then $v_i$ has to be increased so that $$v_i = \min(v_{max}, v_i + (v_{min} - v_{slut})) \qquad (9)$$

otherwise no change in $v_i$ takes place, since $v_{end}$ meets the requirement of being within the range for the reference speed.

On segments in the "steep downgrade" category, the final speed $v_{end}$ is compared with $v_{max}$, and if $v_{end} > v_{max}$, then $v_i$ has to be decreased so that $$v_i = \max(v_{min}, v_i - (v_{slut} - v_{max})) \qquad (10)$$

otherwise no change in $v_1$ takes place, since $v_{end}$ meets the requirement of being within the range for the reference speed.

According to an embodiment of the invention, step E) also comprises determining the entry speed $v_i$ to the segment according to the length of the segment, and the maximum correction of the entry speed $v_i$ is determined by a calculated maximum acceleration or retardation according to rules for the segment categories. Torricelli's equation (1) is preferably used to calculate whether it is possible to achieve $v_{end}$ with the entry speed $v_i$ with comfort requirement, i.e. with a maximum constant acceleration/retardation. If this is not possible because of the length of the segment, $v_i$ is decreased or increased so that the comfort requirement, i.e. not too much acceleration/retardation, can be maintained. The result is assurance that the vehicle will travel comfortably as regards acceleration and retardation.

On segments in the "gentle upgrade" category, the set-point value $v_{ref}$ is allowed to vary between $v_{min}$ and $v_{set}$ when a new segment is incorporated, i.e. $v_{min} \leq v_{ref} \leq v_{set}$. If $v_{ref} \geq v_{min}$, no acceleration of the vehicle is effected. If however $v_{ref} < v_{min}$, then $v_{ref}$ is applied to $v_{min}$ during the segment, or if $v_{ref} > v_{set}$, then $v_{ref}$ is ramped towards $v_{set}$ by means of equation (1). On segments in the "gentle downgrade" category, $v_{ref}$ is allowed to vary between $v_{set}$ and $v_{max}$ when a new segment is incorporated, i.e. $v_{set} \leq v_{ref} \leq v_{max}$, and if $v_{ref} \leq v_{max}$ no retardation of the vehicle is effected. If however $v_{ref} > v_{max}$, then $v_{ref}$ is applied to $v_{max}$ during the segment, or if $v_{ref} < v_{set}$, then $v_{ref}$ is ramped towards $v_{set}$ by means of equation (1). The five segment categories above may be simplified to three by deleting "gentle upgrade" and "gentle downgrade". The "level road" category will then cover a larger range bounded by the calculated threshold values $1_{min}$ and $1_{max}$, so the gradient on the segment has to be smaller than $1_{min}$ if the gradient is negative or greater than $1_{max}$ if the gradient is positive.

When a segment which comes after a segment within the horizon which is in the "gentle upgrade" or "gentle downgrade" category causes a change in the entry speeds to segments in those categories, it may mean that entry speeds and hence the set-point speeds for the control system are corrected and become higher or lower than as indicated by the above rules for the "gentle upgrade or "gentle downgrade" categories. This therefore applies when the entry speeds to segments are corrected according to subsequent segments.

All speed changes requested are therefore preferably ramped by means of Torricelli's equation (1) so that they take place with comfort requirement. Thus it is a general rule not to raise the set-point speed $v_{ref}$ on an upgrade, since any possible speed increase of $v_{ref}$ has to take place before the climb begins if the vehicle is to be driven in a cost-effective way. For the same reason, the set-point speed $v_{ref}$ should not be lowered on a downgrade, since any possible speed decrease of $v_{ref}$ has to take place before the downhill run.

Continuous stepping through all the segments within the horizon makes it possible to determine an internal horizon which presents predicted entry speed values $v_i$ to each segment. The horizon is preferably updated piecemeal in order to have a constant length, and the internal horizon is updated continually as new segments are added to the horizon, e.g. two to three times per second. According to an embodiment of the invention, determining an entry speed $v_i$ involves entry speeds which occur in previous segments being determined by the rules for the segment categories so that said entry speed $v_i$ can be fulfilled. Continuous stepping through segments within the horizon involves continuously calculating the entry values $v_i$ to each segment, so calculating an entry value $v_i$ may entail having to change entry values both forwards and backwards in the internal horizon. Where for example a predicted speed in a segment is outside a set range, it is desirable to correct the speed in preceding segments.

This makes it possible to achieve a desired speed within the speed range and at the same time to drive in a fuel economising way.

Figure 3:
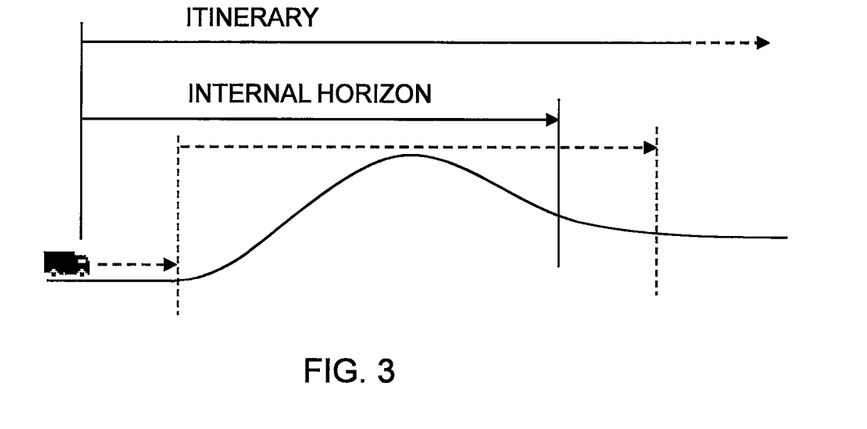
FIG. 3 illustrates the length of a control system's horizon in relation to the length of the itinerary for the vehicle.

FIG. 3 depicts the internal horizon relative to the itinerary. The internal horizon moves continually forwards as indicated by the broken inner horizon moved forward.

Figure 4:
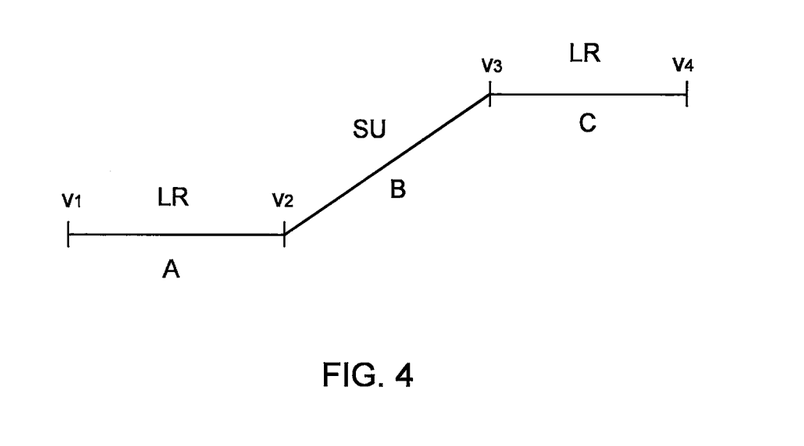
FIG. 4 illustrates the various speeds predicted and the categories of segments on a steep upgrade.
Figure 5:
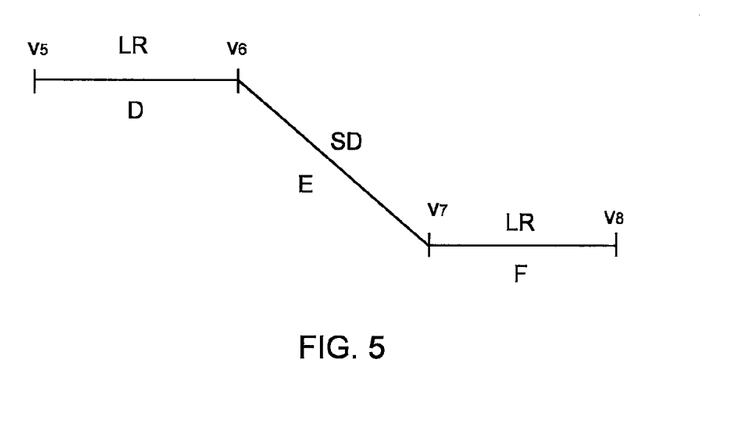
FIG. 5 illustrates the various speeds predicted and the categories of segments on a steep downgrade.
Figure 6:
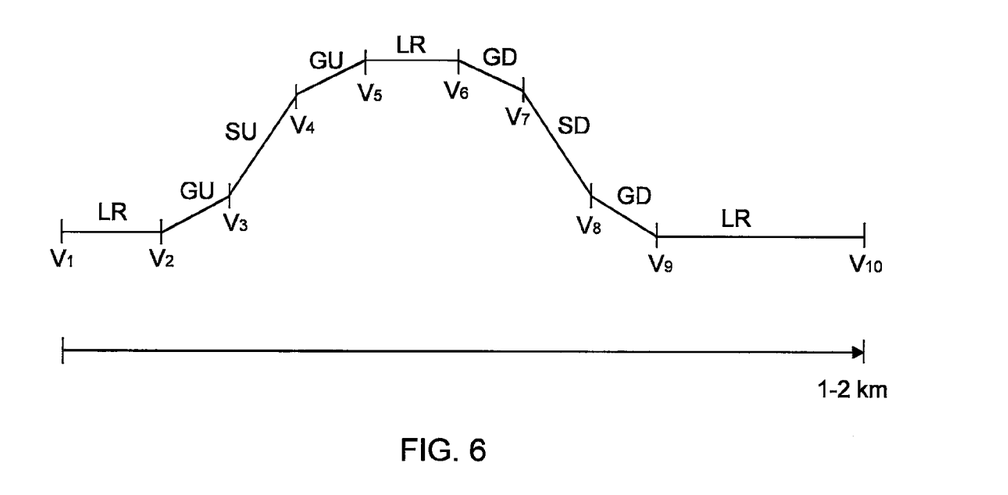
FIG. 6 illustrates the various speeds predicted and the categories of segments which are continuously updated as new segments are added to the horizon

In FIGS. 4, 5 and 6, "LR" stands for "level road", "GU" for "gentle upgrade", "SU" for "steep upgrade", "SD" for "steep downgrade" and "GD" for "gentle downgrade".

FIG. 4 illustrates an example of how the speeds at the beginning and end of each segment are set according to the method when a segment is in the "steep upgrade" category. The segments depicted in the diagram may each consist of one or more composite segments. The driver has here adopted the reference speed $v_{set}$ of 80 km/h and either the driver or the module has adopted minimum and maximum speeds of $v_{min}$=75 and $v_{max}$=85 km/h. In FIG. 4, the speed $v_1$=80 km/h, the same as the reference speed $v_{set}$.

Segment "A" in FIG. 4 is classified as "level road" resulting in prediction of unchanged vehicle speed $v_2$ after the segment. $v_2$ is therefore also 80 km/h.

Segment "B" in FIG. 4 is classified as "steep upgrade". The final speed $v_3$ for segment "B" is then calculated according to formula (2). If $v_3$ is calculated to be less than $v_{min}$, i.e. below 75 km/h, $v_3$ has to be adjusted upwards by $v_3$-$v_{min}$, but at most by $v_{max}$-$v_2$, see formula (9).

To exemplify this, three different calculated final speeds $v_3$ are given for the vehicle after segment "B":

1. If $v_3$ is calculated as 75 km/h, this means no correction from $v_2$, i.e. $v_2$=80 km/h and $v_3$=75 km/h.
2. If $v_3$ is calculated as 73 km/h, this means a correction from $v_2$ by +2 km/h, i.e. $v_2$=82 km/h and $v_3$ becomes 75 km/h.
3. If $v_3$ has become 69 km/h, this means a correction from $v_2$ by +5 km/h, i.e. $v_2$=85 km/h and $v_3$ becomes 74 km/h.

The speed increase to $v_2$ depends also on the length of segment "A". By using a calculated acceleration or retardation which results in comfort acceptance, i.e. acceleration or retardation which is not uncomfortable for the driver, and by calculating on this supposition the highest entry speed $v_2$ which is possible, e.g. by using Torricelli's equation (1), we can also correct $v_2$ so that the comfort requirement can be maintained during segment "A".

After an upgrade, the vehicle may be at a lower speed than the reference speed $v_{set}$ adopted by the driver. This deficit may for example be made up by the system on an imminent downgrade (after segment "C" in FIG. 4).

FIG. 5 illustrates an example of how the speeds at the beginning and end of each segment are set according to the method, when a segment is in the "steep downgrade" category. The segments depicted in the diagram may here again each consist of one or more composite segments. The reference speed $v_{set}$ is 80 km/h and either the driver or the module has adopted minimum and maximum speeds of $v_{min}$=75 and $v_{max}$=85 km/h. In FIG. 5, the speed $v_5$=80 km/h, the same as the reference speed $v_{set}$.

Segment "D" in FIG. 5 is classified as "level road" resulting in prediction of unchanged vehicle speed $v_6$ after the segment. $v_6$ is therefore also 80 km/h.

Segment "E" in FIG. 5 is classified as "steep downgrade". The final speed $v_7$ for segment "E" is then calculated according to equation (1). If $v_7$ is calculated to be more than $v_{max}$, i.e. over 85 km/h, $v_6$ has to be adjusted downwards by $v_6$-$v_{max}$, but at most by $v_{min}$-v6. If $v_7$ is calculated to be greater than $v_{max}$, i.e. over 85 km/h, $v_6$ has to be adjusted by $v_7$-$v_{max}$, but at most by $v_{min}$-$v_6$, see formula (10).

To exemplify this, three different calculated final speeds $v_7$ are given for the vehicle after segment "E":

1. If $v_7$ is calculated as 85 km/h, this means no correction from $v_6$, i.e. $v_6$=80 km/h and $v_7$=85 km/h.
2. If $v_7$ is calculated as 87 km/h, this means a correction from $v_6$ by −2 km/h, i.e. $v_6$=78 km/h and $v_7$ becomes 85 km/h.
3. If $v_7$ is calculated as 91 km/h, this means a correction from $v_6$ by −5 km/h, i.e. $v_6$=75 km/h and $v_7$ becomes 86 km/h.

The speed increase to $v_6$ depends also on the length of segment "D", see FIG. 5. Here again we use a calculated retardation, e.g. by means of Torricelli's equation (5), to calculate a speed increase which provides comfort acceptance.

After a downgrade, the vehicle may be at a higher speed than the reference speed $v_{set}$ adopted by the driver. This surplus may for example be utilised by the vehicle on an imminent upgrade (after segment F in FIG. 5).

FIG. 6 illustrates an example of how entry speeds and final speeds for each segment are determined in the internal horizon which has here a length of 1 to 2 km. In this example, the vehicle's reference speed $v_{set}$ is 80 km/h, $v_{min}$ is 75 km/h and $v_{max}$ is 80 km/h. The vehicle's entry speed $v_i$ at the first segment within the horizon is 80 km/h. As the segment is classified as "level road", the final speed $v_2$ for the segment will be 80 km/h. This is followed by a segment classified as "gentle upgrade", so the final speed $v_3$ for it is set the same as the entry speed $v_2$, 80 km/h. The next segment is a "steep upgrade" for which the final speed $v_4$ predicted in this example is 74 km/h. As this is below $v_{min}$ and the rules for the segment categories indicate that $v_4$ should be 75 km/h, $v_3$ is adjusted to 81 km/h. $v_2$ is then also set to 81 km/h and Torricelli's equation (1) is used to determine whether the speed change from $v_1$ (80 km/h) to $v_2$ (81 km/h) can take place with comfort requirement. In the example this is possible, and as the segment after the "steep upgrade" is a "gentle upgrade", $v_5$ is set the same as $v_4$, i.e. 75 km/h. Next comes a segment classified as "level road", and as the reference speed is 80 km/h the method according to the invention will now increase the speed so that $v_6$ is 80 km/h. The method checks whether this is possible with comfort requirement, and in this example Torricelli's equation (1) indicates that it is not possible, since the highest final speed that can be achieved at the end of the segment is $v_6$=77 km/h. $v_6$ is therefore predicted as 77 km/h. The next segment is a "gentle downgrade", so $v_7$ is set the same as $v_6$, i.e. 77 km/h. Next comes a segment classified as "steep downgrade" and the final speed $v_8$ predicted by formula (2) is 87 km/h. As this exceeds the $v_{max}$ of 85 km/h, $v_7$ has according to the rules for the category to be corrected by −2 km/h. $v_7$ thus becomes 75 km/h, and $v_6$ becomes 75 km/h. As $v_5$ is already set to 75 km/h, no speed increase between $v_5$ and $v_6$ is necessary and a fuel saving can therefore be made. Nor need any more speed changes be made backwards in segments from $v_5$, since $v_6$=$v_5$. The "steep downgrade" segment is followed by a segment classified as "gentle downgrade", so speed $v_9$ will be 85 km/h, the same as $v_8$, according to the rules for the category. The next segment is classified as "level road", so speed $v_{10}$ will depend on what segment categories the next road sections belong to.

The variable set-point speed $v_{ref}$ therefore depends on whether the vehicle is heading for a substantial:

Upgrade, in which case the speed may possibly be raised before the climb
Level road, in which case the speed may possibly be raised
Downgrade, in which case an existing lower speed may possibly be maintained.

The fact that the method identifies the next segment category ("steep upgrade", "gentle upgrade", "level road", "gentle downgrade" or "steep downgrade") will therefore affect the way method varies the set-point speed.

Figure 7:
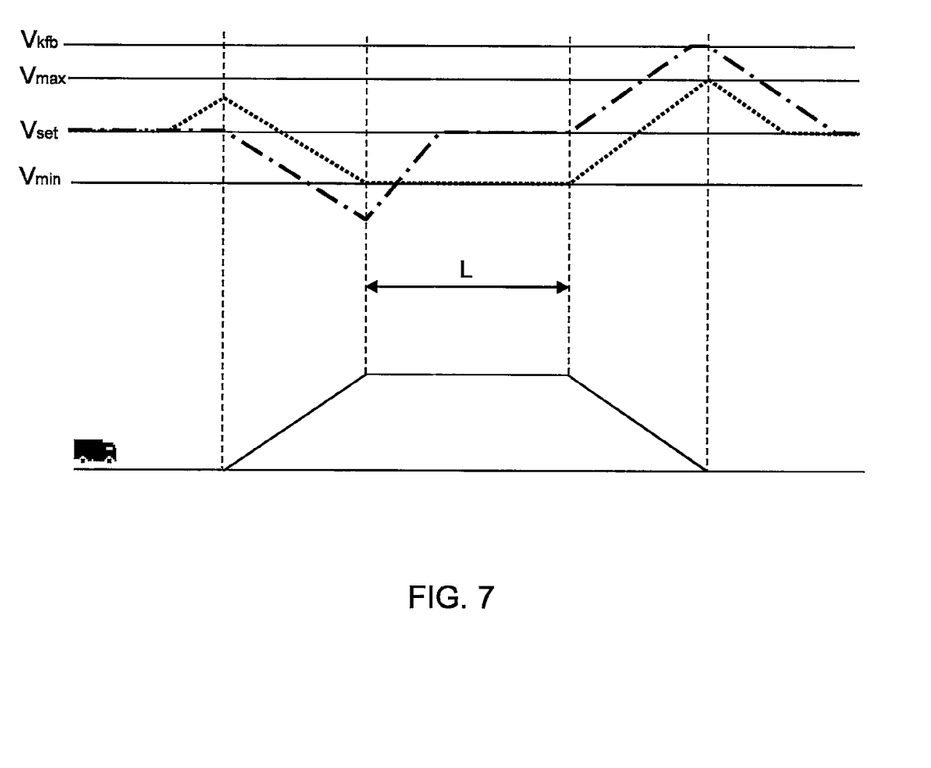
FIG. 7 illustrates the difference between the invention and a traditional cruise control according to an embodiment of the invention.
Figure 8:
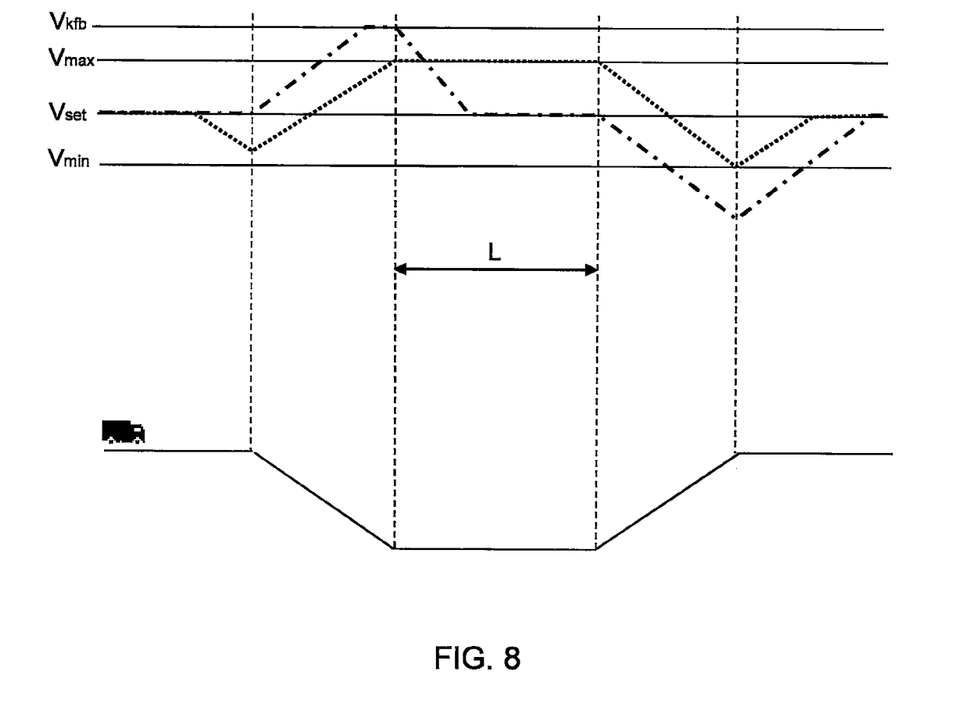
FIG. 8 illustrates the difference between the invention and a traditional cruise control according to an embodiment of the invention.

To avoid consuming unnecessarily large amounts of fuel when a first steep upgrade or a first steep downgrade is followed by a steep upgrade or a steep downgrade within a certain distance L, an embodiment does not allow both acceleration and retardation of the vehicle within the section L. Only acceleration or retardation to a desired speed $v_{ref}$ is effected before the next hill. This embodiment is illustrated in FIG. 7 and FIG. 8. A conventional cruise control is represented by the chain-dotted line and a cruise control according to this embodiment by the dotted line. Section L is here calculated to cover a certain distance which is less than a predetermined threshold value. The threshold value according to an embodiment is 250-500 m. L may for example be calculated by adding together the lengths of segments situated between the hills. When the vehicle has climbed the hill in FIG. 7, $v_{ref}$ is set as its desired speed before the next hill, in this case $v_{min}$. This speed is thereafter maintained throughout section L, i.e. until the vehicle is on, for example, a steep downgrade. Any need for the vehicle to raise speed is thus avoided, since it will endeavour to maintain the speed $v_{set}$, in order to lower the speed later and thereby take advantage of the energy available downhill, i.e. by avoiding having to brake the vehicle. When the vehicle is driven with conventional cruise control, more energy will therefore need to be braked away downhill, as illustrated in the diagram. $v_{kfb}$ represents here the constant speed brake setting, i.e. the vehicle's auxiliary brake cruise control which acts when the vehicle is braked downhill. The vehicle is braked to avoid going above this speed setting. Energy is thus saved by maintaining a constant speed during section L, as illustrated in FIG. 8. When the vehicle has travelled down the hill in FIG. 8, $v_{ref}$ is set as its desired speed before the next hill, in this case $v_{max}$. This speed is thereafter maintained throughout section L, i.e. until the vehicle is on, for example, a steep climb. Any need for the vehicle to raise speed is thus avoided, since the vehicle will endeavour to maintain the speed $v_{set}$.

The present invention relates also to a module 12 for regulating a vehicle's speed, as depicted in FIG. 1. The module comprises a horizon unit 14 configured and operable to determining a horizon by means of received position data and map data 10 of an itinerary made up of route segments with length and gradient characteristics for each segment.

The module 12 further comprises a processor unit 16 configured and operable to performing steps B) to E) as described above. A control system 18 in the vehicle is further configured and operable to regulating the vehicle's speed according to speed set-point values $v_{ref}$ based on the entry speeds $v_i$ to each segment. The result is a module which can be used in a vehicle to determine the set-point speed for a control system when there are steep upgrades and downgrades on the itinerary. The module may be part of a control system for which it is intended to determine set-point values or it may be a freestanding module separate from the control system.

The vehicle-specific values of current transmission ratio, current vehicle weight, engine maximum torque, mechanical friction and/the vehicle's running resistance at current speed are preferably determined in the processor unit. The threshold values can therefore be determined on the basis of the vehicle's state at the time. Signals needed for determining these values may be taken from CAN or be detected by suitable sensors.

According to an embodiment, the processor unit 16 is also configured and operable to calculating the vehicle's final speed $v_{end}$ after the end of the segment on the basis of the force $F_{track}$ acting from the engine torque in the vehicle's direction of movement, the force $F_{roll}$ which is the rolling resistance acting upon the vehicle's wheels, the force $F_\alpha$ acting upon the vehicle because of the gradient a of the segment, and the running resistance. Formula (2) as above is preferably used and it is then possible to predict the final speed $v_{end}$, thereby providing a reference for being able to change the entry speed $v_i$ to the segment. Thus the vehicle's speed can be regulated according to the undulation of the itinerary, in order to drive in a fuel economising way.

According to another embodiment, the processor unit 16 is configured and operable to determining the entry speed $v_i$ to the segment according to the length of the segment, whereby the maximum correction of the entry speed $v_i$ is determined by a calculated maximum acceleration or retardation according to rules for the segment categories. Torricelli's equation (1) is preferably used to calculate whether it is possible to achieve $v_{end}$ with the entry speed $v_i$ with comfort requirement, and if this is not possible because of the length of the segment, $v_i$ is decreased or increased to maintain the comfort requirement, i.e. maintaining not too much acceleration/retardation. Assurance is thus afforded that the vehicle will be driven in a comfortable way as regards acceleration and retardation.

The processor unit is preferably adapted to ramping a requested speed change between two consecutive entry speeds $v_i$ in order to provide the control system with gradually increasing or decreasing speed set-point values $v_{ref}$. The result is a gradual increase in speed so that the vehicle is driven without too much acceleration or retardation.

The horizon unit 14 is preferably configured and operable to determining the horizon continuously so long as the horizon does not exceed a planned itinerary for the vehicle, and the processor unit 16 is preferably configured and operable to continuously performing the steps for calculating and updating the set-point values for the control system for the whole length of the internal horizon. In an embodiment, the horizon is therefore constructed piecemeal as the vehicle travels along the itinerary. The set-point values $v_{ref}$ are calculated and updated continuously irrespective of whether new segments are added or not, since the set-point values to be calculated depend also on how the vehicle-specific values of the vehicle change along the itinerary. According to an embodiment, the processor unit 16 is configured and operable, when determining an entry speed $v_i$, to determining also entry speeds which occur in earlier segments within the rules for their categories, so that said entry speed $v_i$ can be fulfilled. A calculation of an entry value $v_i$ may also entail changes to entry values both forwards and backwards in the internal horizon. It is thus possible to achieve desired speeds within the speed range and at the same time drive in a fuel economising way.

According to an embodiment illustrated in FIGS. 7 and 8, when a first steep upgrade or a first steep downgrade is followed by a steep upgrade or a steep downgrade within a certain distance L, the processor unit 16 is configured and operable to not allowing both acceleration and retardation of the vehicle within the section L. Either acceleration or retardation to a desired speed $v_{ref}$ is applied before the next hill. Fuel can be saved by thus avoiding an increase in the vehicle's speed that would thereafter have to be lowered or a decrease in speed that would thereafter have to be increased.

The present invention comprises also a computer product comprising computer instructions for enabling a computer system in a vehicle to perform the steps according to the method when the computer programme instructions are run on said computer system. The computer instructions are preferably stored on a medium which is readable by a computer system, e.g. a CD ROM, USB memory, or they may be transmitted wirelessly or by line to the computer system.

The present invention is not limited to the embodiments described above. Various alternatives, modifications and equivalents may be used. The aforesaid embodiments therefore do not limit the scope of the invention which is defined by the attached claims.

The invention claimed is:

1. A method performed by a control system incorporating a computer for regulating a vehicle's speed, the method comprising:
   determining a horizon from position data and map data of an itinerary including route segments, each route segment having a with length, an end, and gradient characteristics;
   calculating threshold values according to one or more vehicle-specific values;
   comparing the gradient characteristics of each segment with the threshold values and assigning each segment within the horizon to a respective category according to the results of the comparisons, wherein the threshold values serve as boundaries for assigning the segments to the respective categories;
   for each segment within the horizon assigned to a category indicating a steep upgrade or a steep downgrade, the method comprises:
   calculating the vehicle's final speed $V_{end}$, the final speed $V_{end}$ being a speed immediately after the end of the segment, based inter alia on an entry speed $v_i$ to the segment; and
   when the calculated final speed $V_{end}$ is outside a range for the vehicle's current reference speed $v_{set}$ defined by $V_{max}$ and $V_{min}$, the method comprises:
   correcting the entry speed $v_i$ for the segment on the basis of the calculated final speed $V_{end}$ for the segment,
   wherein the correction is defined by rules for the segment's assigned category, so that $V_{min} \leq V_{end} \leq V_{max}$, on the supposition that $v_i$ is corrected within the same range; and
   regulating the vehicle's speed according to speed set-point values $V_{ref}$ based on a respective entry speed $v_i$ for each segment.

2. A method according to claim 1, wherein the vehicle-values are determined by current transmission ratio, current vehicle weight, a maximum torque curve of an engine of the vehicle, mechanical friction and/or the vehicle's running resistance at current speed.

3. A method according to claim 1, further comprising calculating the vehicle's final speed $V_{end}$ based also on a force $F_{track}$ acting from an engine torque in the vehicle's direction of movement, a force $F_{roll}$ which is a rolling resistance acting upon the vehicle's wheels, a force $F_\alpha$ acting upon the vehicle because of a gradient α of the segment, and a running resistance.

4. A method according to claim 1, wherein the correcting of the entry speed $v_i$ for the segment further comprises: determining the entry speed $v_i$ to the segment according to the length of the segment, whereby a maximum correction of the entry speed $v_i$ is determined by a calculated maximum acceleration or retardation according to rules for the segment categories.

5. A method according to claim 4, wherein the determination of the entry speed $v_i$ involves entry speeds which occur in earlier segments being determined according to the rules for the segment categories so that said entry speed $v_i$ can be fulfilled.

6. A method according to claim 1, further comprising ramping a requested speed change between two consecutive entry speeds $v_i$ to provide the control system with gradually increasing or decreasing speed set-values $V_{ref}$.

7. A method according to claim 1, further comprising when a first steep upgrade or a first steep downgrade is followed by a steep upgrade or a steep downgrade within a section. L, preventing both acceleration and retardation of the vehicle within the section L.

8. A module for regulating a vehicle's speed, the module comprising:
   a horizon unit configured and operable to determine a horizon based on received position data and map data of an itinerary including route segments, each route segment having a length, an end, and a gradient characteristic;
   a processor unit that includes a data processor, the processor unit configured and operable:
   to calculate threshold values according to one or more vehicle-specific values;
   to compare the gradient characteristic of each segment with the threshold values and to assign each segment within the horizon to a respective category according to the results of the comparisons, wherein the threshold values serve as boundaries for assigning the segments to the respective categories; and
   for each segment within the horizon assigned to a category indicating a steep upgrade or a steep downgrade, the processor unit is configured and operable to:
   calculate the vehicle's final speed $V_{end}$, the final speed being a speed immediately after the end of the segment, based inter alia on the entry speed $v_i$ to the segment; and
   correct the entry speed $v_i$ for the segment based on the calculated final speed $V_{end}$ for the segment, wherein the correction is defined by rules for the segment's assigned category, so that $V_{min} \leq V_{end} \leq V_{max}$, on the supposition that $v_i$ is corrected within the same range; and
   a control system configured and operable to regulate the vehicle's speed according to speed set-point values $V_{ref}$ based on a respective entry speed $v_i$ for each segment.

9. A module according to claim 8, wherein vehicle-specific values are determined by current transmission ratio, current vehicle weight, a maximum torque curve of an engine of the vehicle, mechanical friction and/or the vehicle's running resistance at current speed.

10. A module according to claim 8, wherein the processor unit is configured and operable to calculate the vehicle's final speed $V_{end}$ based also on a force $F_{track}$ acting from engine torque in the vehicle's direction of movement, a force $F_{roll}$ which is a rolling resistance acting upon the vehicle's wheels, a force $F_\alpha$ acting upon the vehicle because of a gradient a of the segment, and running resistance.

11. A module according to claim 8, wherein the processor unit is configured and operable to determine the entry speed $v_i$ to the segment according to the length of the segment, wherein a maximum correction of the entry speed $v_i$ is determined by a calculated maximum acceleration or retardation according to rules for the segment categories.

12. A module according to claim 8, wherein the processor unit is configured and operable to ramp a requested speed change between two consecutive entry speeds $v_i$ in order to provide the control system with gradually increasing or decreasing speed set-values $V_{ref}$.

13. A module according to claim 8, wherein when the processor unit is determining an entry speed % the processor unit is also configured and operable to determine entry speeds which occur in earlier segments according to the rules for the segment categories so that the entry speed $v_i$ can be fulfilled.

14. A module according to claim 8, wherein when a first steep upgrade or a first steep downgrade is followed by a steep upgrade or a steep downgrade within a section L, the processor unit is configured and operable to not allowing both acceleration and retardation of the vehicle within the section L.

15. A computer-readable medium incorporating a non-transitory program product comprising computer program of instructions for enabling a computer system in a vehicle to perform the steps of:

determining a horizon from position data and map data of an itinerary
including route segments, each route segment having a with length, an end, and gradient characteristics;
calculating threshold values according to one or more vehicle-specific values;
comparing the gradient characteristics of each segment with the threshold values and assigning each segment within the horizon to a respective category according to the results of the comparisons, wherein the threshold values serve as boundaries for assigning the segments to the respective categories;
for each segment within the horizon assigned to a category indicating a steep upgrade or a steep downgrade, the method comprises:
calculating the vehicle's final seed $V_{end}$, the final seed $V_{end}$ being a speed immediately after the end of the segment, based inter alia on an entry speed $v_i$ to the segment; and
when the calculated final speed Vend is outside a range for the vehicle's current reference seed $v_{set}$ defined by $V_{max}$ and $V_{min}$, the method comprises:
correcting the entry seed $v_i$ for the segment on the basis of the calculated final speed $V_{end}$ for the segment,
wherein the correction is defined by rules for the segment's assigned category, so that $V_{min} \leq V_{end} \leq V_{max}$, on the supposition that $v_i$ is corrected within the same range; and
regulating the vehicle's speed according to speed set-point values $V_{ref}$ based on a respective entry seed $v_i$ for each segment
when the computer program of instructions is run on the computer system.

16. A computer-readable medium program product according to claim 15, wherein the computer system is on-board the vehicle.

* * * * *